(12) United States Patent
Yokomizo

(10) Patent No.: US 10,519,066 B2
(45) Date of Patent: Dec. 31, 2019

(54) DIELECTRIC PORCELAIN COMPOSITION, METHOD FOR PRODUCING DIELECTRIC PORCELAIN COMPOSITION, AND MULTILAYER CERAMIC ELECTRONIC COMPONENT

(71) Applicant: Murata Manufacturing Co., Ltd., Nagaokakyo-shi, Kyoto-fu (JP)

(72) Inventor: Satoshi Yokomizo, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/988,470

(22) Filed: May 24, 2018

(65) Prior Publication Data

US 2018/0265414 A1 Sep. 20, 2018

Related U.S. Application Data

(63) Continuation of application No. PCT/JP2016/086574, filed on Dec. 8, 2016.

(30) Foreign Application Priority Data

Dec. 18, 2015 (JP) ................................ 2015-246909

(51) Int. Cl.
*C04B 35/46* (2006.01)
*C04B 35/468* (2006.01)
(Continued)

(52) U.S. Cl.
CPC .......... *C04B 35/4682* (2013.01); *H01B 3/12* (2013.01); *H01G 4/1218* (2013.01); *H01G 4/30* (2013.01); *C04B 2235/3215* (2013.01)

(58) Field of Classification Search
CPC .............. C04B 35/4682; C04B 35/638; C04B 2235/652; C04B 2235/6584; C04B 2235/3225; C04B 2235/3217; C04B 2235/3281; C04B 2235/3262; C04B 2235/3284; C04B 2235/3206;
(Continued)

(56) References Cited

U.S. PATENT DOCUMENTS

| 7,189,673 B2* | 3/2007 | Okimura | ............... | C01G 23/002 |
| | | | | 501/136 |
| 2006/0068983 A1* | 3/2006 | Okimura | ............... | C01G 23/002 |
| | | | | 501/136 |

(Continued)

FOREIGN PATENT DOCUMENTS

| JP | S5333753 B1 | 9/1978 |
| JP | H09183652 A | 7/1997 |

(Continued)

OTHER PUBLICATIONS

I. Levin, et al.; "Local-structure origins of the sustained Curie temperature in (Ba,Ca)TiO3 ferroelectrics"; Applied Physics Letters 102, 162906 (2013), 6 pps.

(Continued)

*Primary Examiner* — Noah S Wiese
(74) *Attorney, Agent, or Firm* — Arent Fox LLP

(57) ABSTRACT

A dielectric porcelain composition having a main component of a lead-free perovskite type compound at least containing Ba, Ca, Ti, and Sb, and having a Curie temperature Tc of 140° C. or higher.

17 Claims, 1 Drawing Sheet

(51) Int. Cl.
*H01G 4/30* (2006.01)
*H01B 3/12* (2006.01)
*H01G 4/12* (2006.01)

(58) Field of Classification Search
CPC .... C04B 2235/3293; C04B 2235/3239; C04B 2235/3208; C04B 2235/6588; C04B 2235/3418; C04B 2235/3286; C04B 2235/3224; C04B 2235/3213; C04B 2235/3294; C04B 2235/70; H01G 4/1227; H01G 4/23; H01G 4/30
See application file for complete search history.

(56) References Cited

U.S. PATENT DOCUMENTS

| | | |
|---|---|---|
| 2008/0061263 A1 | 3/2008 | Kawada |
| 2009/0036293 A1 | 2/2009 | Shimada et al. |
| 2011/0234364 A1* | 9/2011 | Abe ................... C04B 35/46 338/22 SD |
| 2013/0037904 A1* | 2/2013 | Shimada ............. C04B 35/4682 257/467 |
| 2013/0083450 A1 | 4/2013 | Yoon et al. |
| 2014/0133064 A1* | 5/2014 | Ahn ........................ H01G 4/30 361/303 |

FOREIGN PATENT DOCUMENTS

| | | | |
|---|---|---|---|
| JP | 2005089224 A | 4/2005 | |
| JP | 2012046372 A * | 3/2012 | ........... C04B 35/468 |
| JP | 2013079183 A | 5/2013 | |
| WO | 2006117990 A1 | 9/2006 | |
| WO | 2007097462 A1 | 8/2007 | |

OTHER PUBLICATIONS

International Search Report issued for PCT/JP2016/086574, dated Feb. 7, 2017.
Written Opinion of the International Searching Authority issued for PCT/JP2016/086574, dated Feb. 7, 2017.

* cited by examiner

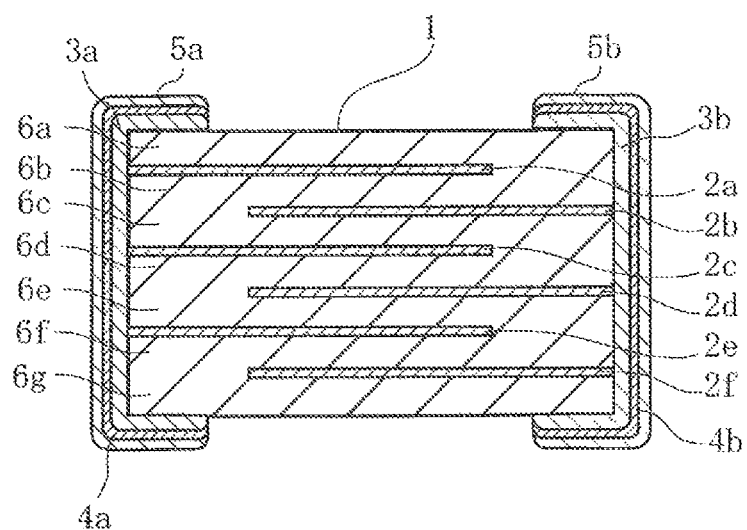

DIELECTRIC PORCELAIN COMPOSITION, METHOD FOR PRODUCING DIELECTRIC PORCELAIN COMPOSITION, AND MULTILAYER CERAMIC ELECTRONIC COMPONENT

CROSS REFERENCE TO RELATED APPLICATIONS

The present application is a continuation of International application No. PCT/JP2016/086574, filed Dec. 8, 2016, which claims priority to Japanese Patent Application No. 2015-246909, filed Dec. 18, 2015, the entire contents of each of which are incorporated herein by reference.

FIELD OF THE INVENTION

The present invention relates to a dielectric porcelain composition, a method for producing the dielectric porcelain composition, and a multilayer ceramic electronic component, and more specifically to a lead-free dielectric porcelain composition suitable for applications requiring a high Curie temperature, a method for producing the dielectric porcelain composition, and a multilayer ceramic electronic component using the dielectric porcelain composition.

BACKGROUND OF THE INVENTION

In recent years, multilayer ceramic electronic components are mounted in various electronic devices, and ceramic materials such as dielectric porcelain compositions used for the multilayer ceramic electronic components are also being actively studied and developed.

This type of dielectric porcelain composition has ferroelectricity disappearing when its Curie temperature Tc is exceeded, and accordingly, to maintain ferroelectricity at higher temperature, it is desired to have a high Curie temperature.

For example, Patent Document 1 proposes a ferroelectric ceramic composition which comprises lead titanate, calcium titanate, and antimony titanate as basic components and has a basic composition represented by the chemical formula $(1-x-y)\ PbTiO_3\text{-}xCaTiO_3\text{-}ySb_{2/3}TiO_3$, where $x=1.0$ to 35 mol % and $y=1.0$ to 30 mol %, and in the above chemical formula, Ti is substituted with Mn by 0.5 to 5 mol %.

Patent Document 1 attempts to obtain a ferroelectric ceramic composition having a high Curie temperature of 200° C. or higher and hence being satisfactorily heat resistant by containing a prescribed amount of Mn in a form of substituting a portion of Ti in a component system having $PbTiO_3$, $CaTiO_3$, and $Sb_{2/3}TiO_3$ as basic components.

Furthermore, Non-Patent Document 1 reports local-structure origins of the sustained Curie temperature in $(Ba,Ca)TiO_3$ ferroelectrics.

Non-patent document 1 describes that $BaTiO_3$ has a Curie temperature Tc of about 400 K (about 127° C.), and while the Curie temperature Tc tends to increase by substituting a portion of Ba with Ca, there exists a Ca content for which the Curie temperature Tc peaks, and when a portion of Ba is substituted with a prescribed amount of Ca or more, the Curie temperature Tc decreases. Specifically, when Ca has a molar ratio x of 0.2 to a total of Ba and Ca, the Curie temperature Tc will be about 410 K (about 137° C.), which is higher than that of $BaTiO_3$, whereas when Ca has a molar ratio x increased to 0.3, the Curie temperature Tc will be about 375 K (about 102° C.), which is lower than that of $BaTiO_3$.

Patent Document 1: Japanese Patent Laying-Open No. 9-183652 (see claim 1 and table 1)

Non-Patent Document 1: I. Levin, et al., "Local-structure origins of the sustained Curie temperature in $(Ba,Ca)TiO_3$ ferroelectrics," Applied Physics Letters, 102, 162906 (2013).

SUMMARY OF THE INVENTION

A multilayer ceramic electronic component has a ceramic layer and an internal electrode layer deposited alternately, and normally, it is produced by firing a ceramic material and an internal electrode material simultaneously.

In this case, it is desirable to use as the internal electrode material a base metal material, such as Ni and Cu, which has good electrical conductivity and is available at a low cost, however, when the base metal material is fired in the air, it is easily oxidized, and accordingly, it needs to be fired in a reducing atmosphere.

In Patent Document 1, however, the ceramic material contains Pb, and if the ceramic material is fired in a reducing atmosphere, Pb is reduced and a desired stable dielectric characteristic cannot be obtained, and it is thus difficult to co-fire the ceramic material together with the base metal material.

Furthermore, in recent years, environmental consciousness is globally increasing, and especially the European Union (EU) has issued the Restriction of Hazardous Substances (ROHS) directive stipulating restriction on use of specified hazardous substances in electrical and electronic devices, the End of Life Vehicles Directive (ELV) stipulating environmental regulation for discarded vehicles, etc. to organize regulations for use of Pb inviting environmental pollution. As such, a Pb containing dielectric porcelain composition as indicated in Patent Document 1 is not preferable from the viewpoint of reduction of environmental burden, either.

Furthermore, although Non-Patent Document 1 indicates substituting a portion of Ba with Ca, the Curie temperature Tc is about 137° C. at the maximum, and it is difficult to use the composition for applications at high temperatures of 140° C. or higher.

The present invention has been made in view of such circumstances, and it is an object of the present invention to provide a lead-free dielectric porcelain composition which does not have a dielectric characteristic impaired even when fired in a reducing atmosphere and has a high Curie temperature and is thus suitable for applications at high temperature, a method for producing the dielectric porcelain composition, and a multilayer ceramic electronic component, such as a multilayer ceramic capacitor, using the dielectric porcelain composition.

In order to achieve the above object, the present inventor has conducted an intensive study on a ceramic raw material containing Sb in addition to Ba, Ca, and Ti, and as a result, found that a dielectric porcelain composition containing as a main component a perovskite type compound obtained by firing the ceramic raw material in a reducing atmosphere has a Curie temperature Tc of as high a temperature as 140° C. or higher while being lead-free.

The present invention has been made based on such findings, and the dielectric porcelain composition according to the present invention has a main component composed of a lead-free perovskite type compound at least containing Ba, Ca, Ti, and Sb, and has a Curie temperature Tc of 140° C. or higher.

While the dielectric porcelain composition can have Ba, Ca, Ti, and Sb contents blended as appropriate to provide a Curie temperature Tc of 140° C. or higher, the dielectric porcelain composition preferably contains Ba, Ca, Ti, and Sb in ranges as follows:

That is, the dielectric porcelain composition according to the present invention has a Sb content preferably of 0.1 to 5 parts by mol with respect to 100 parts by mol of Ti.

Furthermore, the dielectric porcelain composition according to the present invention has a Ba content preferably of 80 parts by mol or more with respect to 100 parts by mol of Ti.

Furthermore, the dielectric porcelain composition according to the present invention has a Ca content preferably of 15 parts by mol or less with respect to 100 parts by mol of Ti.

Furthermore, a method for producing a dielectric porcelain composition according to the present invention includes: preparing a main component powder from a ceramic raw material at least including a Ba compound, a Ca compound, a Ti compound, and an Sb compound; shaping the main component powder into a ceramic shaped body; and firing the ceramic shaped body in a reducing atmosphere to produce a ceramic sintered compact having a Curie temperature Tc of 140° C. or higher.

Furthermore, the method for producing a dielectric porcelain composition according to the present invention is preferably conducted such that the reducing atmosphere has an oxygen partial pressure of $10^{-7}$ to $10^{-11}$ MPa and the firing is done at 1100 to 1400° C.

Furthermore, the method for producing a dielectric porcelain composition according to the present invention is preferably conducted such that the main component powder is prepared by calcining the ceramic raw material in a reducing atmosphere so as to synthesize the main component powder.

Furthermore, a multilayer ceramic electronic component according to the present invention includes a ceramic sintered compact having a plurality of dielectric layers and a plurality of internal electrode layers deposited alternately, the internal electrode layers comprise a base metal material, and the dielectric layers are formed from any one of the above dielectric porcelain compositions.

The dielectric porcelain composition according to the present invention can thus be a dielectric porcelain composition which is lead-free and still ensures a dielectric characteristic in a high-temperature region and is thus suitable for applications at high temperature.

The method for producing a dielectric porcelain composition according to the present invention can achieve a high Curie temperature Tc through firing in a reducing atmosphere, and produce a dielectric porcelain composition which can be co-fired with a base metal material and has a high Curie temperature.

Furthermore, the multilayer ceramic electronic component according to the present invention ensures a desired dielectric characteristic in a high temperature region of 140° C. or higher and is thus suitable for applications at high temperature.

BRIEF DESCRIPTION OF THE DRAWING

The FIGURE is a cross-sectional view showing one embodiment of a multilayer ceramic capacitor fabricated by using the dielectric porcelain composition of the present invention.

DETAILED DESCRIPTION OF THE PREFERRED EMBODIMENTS

Hereinafter, an embodiment of the present invention will be described in detail.

A dielectric porcelain composition as one embodiment of the present invention has a main component composed of a lead-free perovskite type compound (represented by a general formula of $ABO_3$) at least containing Ba, Ca, Ti, and Sb, and has a Curie temperature Tc of 140° C. or higher. And this allows even a dielectric porcelain composition having a main component composed of a lead-free $BaTiO_3$-based compound to have a high Curie temperature and ensure a desired dielectric characteristic even in a region of high temperature of 140° C. or higher and be thus suitable for applications at high temperature.

That is, a $BaTiO_3$-based perovskite type compound is widely known as a dielectric porcelain composition capable of providing a high relative dielectric constant.

However, as has been discussed herein above, $BaTiO_3$ has a low Curie temperature Tc of about 127° C., and even if it contains Ca, it has a Curie temperature Tc of about 137° C. at the maximum, and its ferroelectricity disappears once the Curie temperature has been exceeded. Thus, simply substituting a portion of Ba with Ca does not reliably provide a dielectric porcelain composition which can be used for applications at high temperature of 140° C. or higher.

As a result of a diligent research by the present inventor, it has been found that when Sb is added to $(Ba, Ca)TiO_3$ and a heat treatment is applied thereto in a reducing atmosphere a Curie temperature Tc of 140° C. or higher can be obtained. A reason for this is presumed as follows:

When Sb is added to $(Ba, Ca)TiO_3$ and a heat treatment is applied thereto in the air, Sb forms a solid solution at a B site. That is, as the Sb's compound forms, there normally exist a trivalent Sb compound such as $Sb_2O_3$ and a pentavalent Sb compound such as $Sb_2O_5$. In that case, when synthesizing the main component powder or firing the main component powder after it is synthesized is performed in the air, the trivalent Sb compound is oxidized to be pentavalent, and the pentavalent Sb compound maintains its valence. Since the pentavalent Sb has an ionic radius of about 0.060 nm and Ti has an ionic radius of about 0.061 nm, the pentavalent Sb forms a solid solution at a B site in a form of substituting a portion of Ti having a similar ionic radius.

In contrast, when synthesizing the main component powder or firing the main component powder after it is synthesized is performed in a reducing atmosphere, the trivalent Sb compound maintains its valence, and the pentavalent Sb compound is reduced to be trivalent. And as the trivalent Sb has an ionic radius of about 0.076 nm, which is larger than Ti's ionic radius (0.061 nm), it is difficult for the trivalent Sb to form a solid solution at a B site where Ti is coordinated. Furthermore, when the main component powder is calcined and thus synthesized in the air and fired in a reducing atmosphere, Sb becomes trivalent with a large ionic radius from being pentavalent with a small ionic radius, and accordingly, it is believed that even if Sb forms a solid solution at a B site after the calcination and synthesis, Sb is separated from the B site by the firing treatment in the reducing atmosphere, and forms a solid solution at an A site where Ba having as large an ionic radius as 0.135 nm is coordinated in a form of substituting a portion of Ba.

As a result of Sb forming a solid solution at an A site as described above, Sb is covalently bonded to an O atom and thus displaced from the center position of the A site, which increases the ratio c/a between a c axis and an a axis in the crystal axis and hence improves tetragonal crystallinity and hence a temperature at which ferroelectricity is maintained, that is, the Curie temperature Tc. That is, while the perovskite type compound, at the Curie temperature Tc or therebelow, has a crystal structure maintaining tetragonal crystallinity and presenting ferroelectricity, once the Curie temperature Tc is exceeded, the crystal structure undergoes a phase transition from tetragonal to cubic, and thereby ferroelectricity disappears. It is believed that when Sb is reduced by a heat treatment in a reducing atmosphere and forms a solid solution at an A site, Sb is covalently bonded to an O atom, and as a result, Sb is displaced from the center position of the A site, and tetragonal crystallinity is improved and the Curie temperature Tc rises.

In addition, as the dielectric porcelain composition of the present invention is lead-free and accordingly, also reduces an environmental burden, and furthermore, it is obtained through a heat treatment in a reducing atmosphere, it can be co-fired together with a base metal material such as Ni and Cu, and can thus be a dielectric porcelain composition suitable for applications at high temperature.

In so far as the perovskite type compound contains at least Ba, Ti, Ca, and Sb as components and has a Curie temperature Tc of 140° C. or higher, the content of each component is not particularly limited. In other words, the components can be blended in contents allowing the Curie temperature Tc to be 140° C. or higher.

An example of a preferable range of each component is as follows:

Ba is a main element for implementing a dielectric porcelain composition having a high relative dielectric constant together with Ti. In order to obtain a desired high relative dielectric constant at a high Curie temperature Tc of 140° C. or higher, 80 parts by mol or more of Ba are preferable with respect to 100 parts by mol of Ti.

Ca is contained in a $BaTiO_3$-based compound to contribute to improvement of the Curie temperature Tc, and accordingly, it is an essential component in the present invention. However, when the content of Ca exceeds 15 parts by mol with respect to 100 parts by mol of Ti, the Curie temperature Tc rather tends to decrease, and may decrease to lower than 140° C., and accordingly, 15 parts by mol or less of Ca are preferable.

Sb can be subjected to a heat treatment in a reducing atmosphere to form a solid solution in the main component to contribute to improvement of the Curie temperature Tc, as has been discussed above, and allows the Curie temperature Tc to be 140° C. or higher. And to do so, the Sb content is preferably 0.1 part by mol or more with respect to 100 parts by mol of Ti. In contrast, if Sb is contained excessively, the Ba content is relatively decreased, which may invite a reduced relative dielectric constant, and accordingly, the Sb content is preferably 5 parts by mol or less with respect to 100 parts by mol of Ti.

While the perovskite compound has an A site/B site ratio of 1.000 when represented as a stoichiometric ratio, it is not limited as such and can for example be adjusted as appropriate to have a ratio of (Ba+Ca)/Ti falling within a range of 0.95 to 1.00 as converted to a molar ratio.

Further, the present dielectric porcelain composition is only required to have the above-described perovskite type compound to constitute a main component (for example, 80 mol % or more, preferably 90 mol % or more, more preferably 95 mol % or more), and may contain various additives as a sub component.

Hereinafter, a method for producing the present dielectric porcelain composition will be described in detail.

Initially, as ceramic raw materials, a Ba compound, a Ti compound, a Ca compound, and an Sb compound are prepared. Then, these ceramic raw materials are weighed by prescribed amounts. Note that Sb is a volatile element and volatilized when subjected to a heat treatment in a reducing atmosphere, and accordingly, the Sb compound is excessively weighed.

Subsequently, the weighed materials are charged into a ball mill together with a grinding medium, such as PSZ (Partially Stabilized Zirconia) balls, and pure water, mixed and ground sufficiently in a wet manner, dried and thereafter calcined in a reducing atmosphere or the air and thus synthesized to prepare a main component powder.

When the weighed materials are calcined in a reducing atmosphere, they are calcined for about 1 hour at 900 to 1100° C. in a reducing atmosphere of $N_2$—$H_2$—$H_2O$ with an oxygen partial pressure adjusted to allow the Sb compound to be reduced, e.g., $10^{-7}$ to $10^{-11}$ MPa.

When the weighed materials are calcined in the air, they are calcined in the air at 900 to 1100° C. for about 1 hour.

Subsequently, the main component powder is put into a ball mill together with an organic binder, an organic solvent and a grinding medium, wet-mixed, dried, and thereafter pressed to produce a ceramic shaped body.

Thereafter, the ceramic shaped body is heated in the air at 250 to 350° C. to have the binder burnt and thus removed therefrom, and furthermore, the ceramic shaped body is fired at a prescribed temperature for about 2 hours in a reducing atmosphere of gaseous $H_2$—$N_2$—$H_2O$ with an oxygen partial pressure adjusted to disallow the Sb in the main component to be oxidized, e.g., $10^{-7}$ to $10^{-11}$ MPa, to produce a dielectric porcelain composition which is a ceramic sintered compact having a Curie temperature Tc of 140° C. or higher.

While the ceramic shaped body may be fired at any temperature allowing the ceramic shaped body to be sintered, it is preferable that the temperature be set in a range of 1100 to 1400° C. More specifically, when the ceramic shaped body is fired at a temperature lower than 1100° C., which is excessively low, it may be difficult to sinter the ceramic shaped body. From the viewpoint of energy conservation, it is preferable that the ceramic shaped body be fired at 1400° C. or lower.

Thus the method for producing a dielectric porcelain composition as described above allows a high Curie temperature Tc to be obtained through firing in a reducing atmosphere, and can thus produce a dielectric porcelain composition which can be co-fired with a base metal material and has a high Curie temperature Tc.

Hereinafter, a multilayer ceramic electronic component of the present invention will be described in detail.

The FIGURE is a cross-sectional view schematically showing one embodiment of a multilayer ceramic capacitor serving as a multilayer ceramic electronic component produced using the dielectric porcelain composition according to the present invention.

In the multilayer ceramic capacitor, internal electrode layers 2a to 2f are buried in a ceramic sintered compact 1, external electrodes 3a and 3b are formed at opposite ends of ceramic sintered compact 1, and first plating films 4a and 4b and second plating films 5a and 5b are formed on surfaces of external electrodes 3a and 3b.

That is, ceramic sintered compact 1 is formed by alternately stacking and firing dielectric layers 6a to 6g formed of the dielectric porcelain composition of the present invention and internal electrode layers 2a to 2f, and internal electrode layers 2a, 2c and 2e are electrically connected to external electrode 3a and internal electrodes 2b, 2d and 2f are electrically connected to external electrode 3b. Internal electrode layers 2a, 2c, 2e have surfaces opposite to those of internal electrode layers 2b, 2d, 2f, respectively, and electrostatic capacitance is formed between these opposite surfaces.

In the present multilayer ceramic capacitor, internal electrode layers 2a to 2f are formed of a base metal material and dielectric layers 6a to 6g are formed of the above-described dielectric porcelain composition, and even in a case with internal electrode layers 2a to 2f formed using a base metal material, a multilayer ceramic capacitor which ensures a desired dielectric characteristic in a high temperature region of 140° C. or higher and is thus suitable for applications at high temperature, can be obtained.

The above multilayer ceramic capacitor can be easily produced in the following method:

Initially, a main component powder is prepared in the same method and procedure as described for the method for producing the dielectric porcelain composition as described above.

Subsequently, the main component powder is charged into a ball mill together with an organic binder, an organic solvent and a grinding medium and wet-mixed to prepare a ceramic slurry, which is in turn shaped through a RIP process, a doctor blade process, or the like to prepare a ceramic green sheet to have a thickness of about 2 μm or less after it is fired.

Subsequently, a conductive paste for the internal electrodes which contains a base metal material such as Ni, Cu or the like is prepared. Subsequently, the conductive paste for the internal electrodes is used to provide screen-printing on the ceramic green sheet to form a conductive film of a predetermined pattern on a surface of the ceramic green sheet.

Subsequently, a plurality of such ceramic green sheets each having the conductive film formed thereon are stacked in a predetermined direction and a ceramic green sheet which does not have the conductive film formed thereon is placed as a topmost layer, and the ceramic green sheets are compressed together and cut to have a predetermined dimension to thus produce a multilayer shaped body.

After that, the binder is removed under the same condition as described above, and subsequently, a firing treatment is performed to produce ceramic sintered compact 1.

Subsequently, a conductive paste for the external electrodes is applied to opposite end surfaces of ceramic sintered compact 1 and baked at 600 to 800° C. to form external electrodes 3a and 3b.

The conductive paste for the external electrodes contains a conductive material, which is also not particularly limited, although from the viewpoint of cost reduction a material containing Ag, Cu, or an alloy thereof as a main component is preferably used.

External electrodes 3a and 3b may be formed in a method as follows: the conductive paste for the external electrodes is applied to the opposite end surfaces of the multilayer shaped body and fired together with the multilayer shaped body simultaneously.

Finally, electrolytic plating is performed to form first plating films 4a, 4b made of Ni, Cu, a Ni—Cu alloy or the like on the surfaces of external electrodes 3a, 3b, and furthermore, second plating films 5a, 5b made of solder, tin, or the like are formed on the surfaces of first plating films 4a, 4b to thus produce a multilayer ceramic capacitor.

It should be noted that the present invention is not limited to the above embodiment. While in the above embodiment a multilayer ceramic capacitor is indicated as a multilayer ceramic electronic component by way of example, it is needless to say that the present invention is applicable to various multilayer ceramic electronic components for applications at high temperature containing a $BaTiO_3$-based perovskite type compound as a main component.

The ceramic raw materials such as a Ba compound and a Ti compound can also be appropriately selected, such as carbonate, oxide, nitrate, hydroxide, organic acid salt, alkoxide, a chelate compound, etc., depending on the form of the synthesis reaction.

Furthermore, the method for synthesizing the main component powder is not limited to the above-mentioned solid phase method, either, and a synthesis method such as a coprecipitation method, a hydrothermal method, an oxalic acid method, etc. may be used.

EXAMPLES

Hereinafter, examples of the present invention will be described in detail.

[Preparing Samples]

$BaCO_3$, $CaCO_3$, $TiO_2$, and $Sb_2O_3$ were prepared as ceramic raw materials and weighed such that after they were fired Ba, Ca, and Sb in parts by mol with respect to 100 parts by mol of Ti were as shown in Table 1. As it was assumed that $Sb_2O_3$ would be volatilized when fired in a reducing atmosphere, $Sb_2O_3$ was excessively weighed by 50 to 100% by mol.

Subsequently, these weighed materials were charged into a ball mill together with PSZ balls and pure water, sufficiently wet mixed and thus ground, and dried, and thereafter fired at 1100° C. for about 1 hour in a reducing atmosphere of gaseous $H_2$—$N_2$—$H_2O$ with an oxygen partial pressure adjusted to $10^{-8.5}$ MPa, and ground to obtain calcined powder (i.e., the main component powder).

Subsequently, polyvinyl alcohol was added to the calcined powder such that the polyvinyl alcohol has a weight ratio of 2 wt % to obtain a mixture. Subsequently, this mixture was subjected to a pressure of 1000 MPa by a uniaxial press to provide a ceramic shaped body having a diameter of 10 mm and a thickness of 0.5 mm.

Subsequently, the ceramic shaped body was fired at 1000 to 1400° C. for about 1 hour in a reducing atmosphere of gaseous $H_2$—$N_2$—$H_2O$ with an oxygen partial pressure adjusted to $10^{-7}$ to $10^{-11}$ MPa or the air with an oxygen partial pressure of $10_{-1.7}$ MPa to provide a ceramic sintered compact.

Subsequently, a conductive paste containing Ag as a main component was applied to opposite end surfaces of the ceramic sintered compact and baked at 600° C. to form an external electrode to thus produce sample Nos. 1-38.

[Assessment of Samples]

The ceramic sintered compacts of Sample Nos. 1 to 38 were subjected to a structural analysis in an XRD method (X-ray diffraction method) before the external electrodes were formed. As a result, it was confirmed that the ceramic sintered compacts all had a perovskite type crystal structure.

Furthermore, the ceramic sintered compacts of Sample Nos. 1 to 38 were dissolved and analyzed through ICP-AES (Inductively Coupled Plasma-Emission Spectroscopy), and it was confirmed that they contained Ba, Ca, and Sb in parts by mol with respect to 100 parts by mol of Ti, as shown in Table 1.

Subsequently, sample Nos. 1 to 38 had measured their relative dielectric constants cr and Curie temperatures Tc.

Relative dielectric constant cr was measured with an LCR meter (E4980A, manufactured by Agilent Technologies)

with a measurement frequency of 1 kHz and a measurement voltage of 0.5 Vrms at a temperature of 25±3° C.

Curie temperature Tc was measured as follows: the above LCR meter and a constant-temperature bath were used to measure a relative dielectric constant in a temperature range of −55 to +160° C. and a temperature at which the relative dielectric constant is maximized is set as a Curie temperature Tc.

Table 1 shows the compositions, firing temperatures, firing atmospheres, relative dielectric constants εr, and Curie temperatures Tc of Sample Nos. 1 to 38.

TABLE 1

| sample Nos. | content with relative to 100 parts by mol of Ti (in parts by mol) | | | firing temperature (° C.) | firing atmosphere | relative dielectric constant εr | Curie temperature Tc (° C.) |
|---|---|---|---|---|---|---|---|
| | Ba | Ca | Sb | | | | |
| 1* | 100.00 | 0 | 0.00 | 1300 | reducing | 2513 | 124 |
| 2* | 95.00 | 5.00 | 0.00 | 1300 | reducing | 2014 | 136 |
| 3* | 90.00 | 10.00 | 0.00 | 1300 | reducing | 1687 | 131 |
| 4* | 85.00 | 15.00 | 0.00 | 1300 | reducing | 1212 | 121 |
| 5 | 94.91 | 5.00 | 0.10 | 1300 | reducing | 2816 | 140 |
| 6 | 94.05 | 4.95 | 1.00 | 1300 | reducing | 2897 | 140 |
| 7 | 90.25 | 4.75 | 5.00 | 1300 | reducing | 2431 | 143 |
| 8* | 95.00 | 5.00 | 0.00 | 1300 | the air | 2769 | 136 |
| 9* | 94.91 | 5.00 | 0.10 | 1300 | the air | 1897 | 132 |
| 10* | 94.05 | 4.95 | 1.00 | 1300 | the air | 975 | 124 |
| 11* | 90.25 | 4.75 | 5.00 | 1300 | the air | 642 | 101 |
| 12* | 95.00 | 5.00 | 0.00 | 1000 | reducing | — | — |
| 13* | 94.91 | 5.00 | 0.10 | 1000 | reducing | — | — |
| 14* | 94.05 | 4.95 | 1.00 | 1000 | reducing | — | — |
| 15* | 90.25 | 4.75 | 5.00 | 1000 | reducing | — | — |
| 16* | 95.00 | 5.00 | 0.00 | 1100 | reducing | 1521 | 136 |
| 17 | 94.91 | 5.00 | 0.10 | 1100 | reducing | 1432 | 141 |
| 18 | 94.05 | 4.95 | 1.00 | 1100 | reducing | 521 | 141 |
| 19 | 90.25 | 4.75 | 5.00 | 1100 | reducing | 435 | 143 |
| 20* | 95.00 | 5.00 | 0.00 | 1400 | reducing | 2578 | 136 |
| 21 | 94.91 | 5.00 | 0.10 | 1400 | reducing | 2916 | 141 |
| 22 | 94.05 | 4.95 | 1.00 | 1400 | reducing | 2697 | 142 |
| 23 | 90.25 | 4.75 | 5.00 | 1400 | reducing | 2231 | 145 |
| 24* | 99.90 | 0 | 0.10 | 1300 | reducing | 2912 | 131 |
| 25 | 94.91 | 5.00 | 0.10 | 1300 | reducing | 2816 | 140 |
| 26 | 89.91 | 9.99 | 0.10 | 1300 | reducing | 1762 | 142 |
| 27 | 84.92 | 14.99 | 0.10 | 1300 | reducing | 1132 | 140 |
| 28* | 79.92 | 19.98 | 0.10 | 1300 | reducing | 652 | 134 |
| 29* | 99.00 | 0 | 1.00 | 1300 | reducing | 3018 | 132 |
| 30 | 94.05 | 4.95 | 1.00 | 1300 | reducing | 2897 | 140 |
| 31 | 89.10 | 9.90 | 1.00 | 1300 | reducing | 1782 | 143 |
| 32 | 84.15 | 14.85 | 1.00 | 1300 | reducing | 1231 | 141 |
| 33* | 79.20 | 19.80 | 1.00 | 1300 | reducing | 579 | 135 |
| 34* | 95.00 | 0 | 5.00 | 1300 | reducing | 2678 | 128 |
| 35 | 90.25 | 4.75 | 5.00 | 1300 | reducing | 2431 | 143 |
| 36 | 85.50 | 9.50 | 5.00 | 1300 | reducing | 1457 | 145 |
| 37 | 80.75 | 14.25 | 5.00 | 1300 | reducing | 1121 | 142 |
| 38* | 76.00 | 19.00 | 5.00 | 1300 | reducing | 782 | 134 |

*departing from the scope of the present invention

Sample Nos. 1 to 4, 16, and 20 were subjected to a firing treatment in a reducing atmosphere, however, their ceramic sintered compacts did not contain Sb, and accordingly, had a Curie temperature Tc of 121 to 136° C., i.e., lower than 140° C.

Sample No. 8 provided a ceramic sintered compact which did not contain Sb and was also fired in the air, and accordingly, had a Curie temperature Tc of 136° C., i.e., also lower than 140° C.

Sample Nos. 9 to 11 presented a Curie temperature Tc of 101 to 132° C., i.e., less than 140° C. It is believed that this is because although the samples' ceramic sintered compacts contained Sb, they were fired in the air, and accordingly, Sb did not form a solid solution at an A site but a B site, and accordingly, they were unable to have improved tetragonal crystallinity and hence an increased Curie temperature Tc.

Sample Nos. 12 to 15 had their ceramic shaped bodies fired at an excessively low temperature of 1000° C. and were thus unable to have them sintered.

Sample Nos. 24, 29 and 34 provided ceramic sintered compacts which did not contain Ca and accordingly, had as low a Curie temperature Tc as 128 to 132° C.

Sample Nos. 28, 33, 38 presented a Curie temperature Tc of 134 to 135° C., i.e., less than 140° C. It is believed that this is because they had a small Ba content less than 80 parts by mol with respect to 100 parts by mol of Ti on one hand, and a Ca content exceeding 15 parts by mol with respect to 100 parts by mol of Ti on the other hand.

In contrast, Sample Nos. 5 to 7, 17 to 19, 21 to 23, 25 to 27, 30 to 32, and 35 to 37 presented a Curie temperature Tc of 140° C. or higher and hence presented it satisfactorily. In other words, it has been found that by appropriately controlling Ba, Ca, Ti, and Sb contents and a firing condition, a dielectric porcelain composition can be obtained which is lead-free and still has a Curie temperature Tc of 140° C. or higher and is thus suitable for applications at high temperature. Note that in the present example, a dielectric porcelain composition having a Curie temperature of 140° C. was able to be obtained by setting Ba, Ca and Sb contents to 80 parts by mol or more, 15 parts by mol or less, and a range of 0.1 to 5 mol parts, respectively, with respect to 100 mol parts of Ti, and firing at 1100 to 1400° C. in a reducing atmosphere with an oxygen partial pressure of $10^{-7}$ to $10^{-11}$ MPa.

A lead-free dielectric porcelain composition which does not have a dielectric characteristic impaired even when fired in a reducing atmosphere and has a high Curie temperature and is thus suitable for applications at high temperature, and a multilayer ceramic electronic component, such as a multilayer ceramic capacitor, are implemented.

REFERENCE SIGNS LIST

1: ceramic sintered compact
2a-2f: internal electrode layer
6a-6g: dielectric layer

The invention claimed is:

1. A dielectric porcelain composition comprising a lead-free perovskite compound having a main component at least containing Ba, Ca, Ti, and Sb, the dielectric porcelain composition having a Curie temperature Tc of 140° C. or higher, and wherein the Sb is in the form of a solid solution at an A site of the lead-free perovskite compound.

2. The dielectric porcelain composition according to claim 1, wherein the Sb is contained in an amount of 0.1 to 5 parts by mol with respect to 100 parts by mol of the Ti.

3. The dielectric porcelain composition according to claim 1, wherein the Ba is contained in an amount of 80 parts by mol or more with respect to 100 parts by mol of the Ti.

4. The dielectric porcelain composition according to claim 1, wherein the Ca is contained in an amount of 15 parts by mol or less with respect to 100 parts by mol of the Ti.

5. The dielectric porcelain composition according to claim 2, wherein the Ba is contained in an amount of 80 parts by mol or more with respect to 100 parts by mol of the Ti.

6. The dielectric porcelain composition according to claim 5, wherein the Ca is contained in an amount of 15 parts by mol or less with respect to 100 parts by mol of the Ti.

7. The dielectric porcelain composition according to claim 2, wherein the Ca is contained in an amount of 15 parts by mol or less with respect to 100 parts by mol of the Ti.

8. A multilayer ceramic electronic component comprising:
   a plurality of dielectric layers; and
   a plurality of internal electrode layers deposited alternately with respective dielectric layers of the plurality of dielectric layers, wherein
   the internal electrode layers comprise a base metal material, and
   the dielectric layers are formed from the dielectric porcelain composition according to claim 1.

9. A method for producing a dielectric porcelain composition, the method comprising:
   preparing a main component powder from a ceramic raw material at least including a Ba compound, a Ca compound, a Ti compound, and an Sb compound;
   a shaping the main component powder into a ceramic shaped body; and
   firing the ceramic shaped body in a reducing atmosphere to produce a ceramic sintered compact having a Curie temperature Tc of 140° C. or higher,
   wherein Sb is in the form of a solid solution at an A site of a lead-free perovskite compound of the ceramic sintered compact.

10. The method for producing a dielectric porcelain composition according to claim 9, wherein the reducing atmosphere has an oxygen partial pressure of $10^{-7}$ to $10^{-11}$ MPa, and the firing is done at 1100 to 1400° C.

11. The method for producing a dielectric porcelain composition according to claim 9, wherein the main component powder is prepared by calcining the ceramic raw material in a reducing atmosphere so as to synthesize the main component powder.

12. The method for producing a dielectric porcelain composition according to claim 9, wherein the Sb is contained in the ceramic sintered compact in an amount of 0.1 to 5 parts by mol with respect to 100 parts by mol of Ti.

13. The method for producing a dielectric porcelain composition according to claim 9, wherein Ba is contained in the ceramic sintered compact in an amount of 80 parts by mol or more with respect to 100 parts by mol of Ti.

14. The method for producing a dielectric porcelain composition according to claim 9, wherein Ca is contained in the ceramic sintered compact in an amount of 15 parts by mol or less with respect to 100 parts by mol of the Ti.

15. The method for producing a dielectric porcelain composition according to claim 12, wherein Ba is contained in the ceramic sintered compact in an amount of 80 parts by mol or more with respect to 100 parts by mol of the Ti.

16. The method for producing a dielectric porcelain composition according to claim 15, wherein Ca is contained in the ceramic sintered compact in an amount of 15 parts by mol or less with respect to 100 parts by mol of the Ti.

17. The method for producing a dielectric porcelain composition according to claim 12, wherein Ca is contained in the ceramic sintered compact in an amount of 15 parts by mol or less with respect to 100 parts by mol of the Ti.

* * * * *